UNITED STATES PATENT OFFICE.

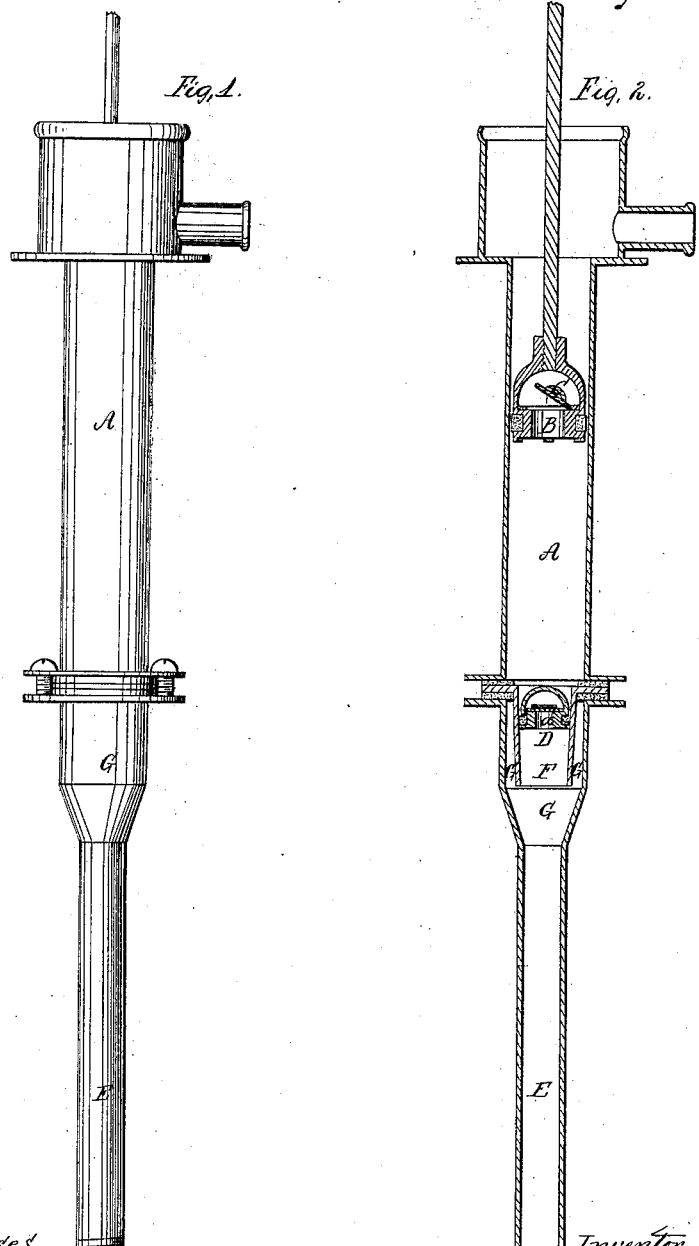

ALBERT RUSSELL, OF NEWBURYPORT, MASSACHUSETTS.

PUMP.

Specification of Letters Patent No. 33,008, dated August 6, 1861.

*To all whom it may concern:*

Be it known that I, ALBERT RUSSELL, of Newburyport, in the county of Essex and State of Massachusetts, have invented an Improvement in Pumps; and I do hereby declare the same to be fully described in the following specification and illustrated in the accompanying drawings, of which—

Figure 1 is a side elevation, and Fig. 2 a longitudinal section of a ship's pump constructed with my invention, the nature of which is found in providing the pump with an auxiliary induction pipe and an air chamber arranged relatively to each other and to the lower valve or box, and to the main induction pipe, as hereinafter specified, and as represented in the drawings.

In the said drawings A denotes the barrel, B the piston, and C the upper valve, of an ordinary lifting pump.

D is the lower valve, while E is the main induction pipe. To such main pipe I apply a short auxiliary induction pipe F so as to project downward from the valve opening $a$ and into an air chamber or vessel G, which I form around and below the pipe F, and between the lower valve D and the upper end of the pipe E.

By means of the air chamber G and the pipe F, arranged and applied to the pump and its pipe E, as described, we avoid the usual jerking action of the piston or upper box, which usually takes place at the commencement of the up stroke and particularly while the piston is in rapid motion.

While the pump is in use and the piston is moving in the barrel, the fluid, being elevated, will be caused to rush up the induction pipe with considerable velocity. The moment the down stroke of the piston commences the lower valve will be suddenly closed against the uprushing column of fluid in the induction pipe. The velocity generated in such column will cause the water to pass into the air chamber and condense the air therein; and this will take place more or less during the down stroke of the piston. As soon as the up stroke commences, the elasticity of the compressed air in the air chamber will be brought into play to expel the water from such air chamber; and, as such water will be close to the lower valve opening and in a large body, it will easily enter the same and follow the piston, and thus prevent the usual jerk which follows when the pump is unprovided with an air chamber. By means of the air chamber and the auxiliary induction pipe the operation of the pump is not only improved or rendered easier, but the amount of water raised will be greater than is the case when the pump has no such appliances.

I do not claim the broad application of an air vessel to the suction pipe either of a lifting or a forcing pump; but What I do claim is—

My improved pump as constructed with the auxiliary induction pipe F and the air chamber or vessel G arranged relatively to each other, to the lower box or valve, and to the main induction pipe E, as specified.

ALBERT RUSSELL.

Witnesses:
 WILLIAM DAVIS,
 JOHN COOK.